United States Patent [19]

Johnston et al.

[11] 4,270,551
[45] Jun. 2, 1981

[54] AIR BAFFLE FOR HARVESTER ACCELERATOR ROLLS

[75] Inventors: David K. Johnston, Blue Springs, Mo.; Donald A. Suderman, Manhattan, Kans.

[73] Assignee: Allis-Chalmers Corporation, Milwaukee, Wis.

[21] Appl. No.: 87,162

[22] Filed: Oct. 22, 1979

[51] Int. Cl.³ ............................................ A01D 41/12
[52] U.S. Cl. .................................. 130/27 H; 56/14.6
[58] Field of Search ............ 130/27 H, 27 HF, 27 T, 130/27 Z, 27 E, 27 Q, 27 Y, 24, 27 R; 56/14.6

[56] References Cited

U.S. PATENT DOCUMENTS

| 4,007,744 | 2/1977 | Shaver | 130/27 Q |
| 4,103,691 | 8/1978 | Shaver | 130/24 |
| 4,108,150 | 8/1978 | Shaver | 130/27 H |
| 4,154,250 | 5/1979 | Stuber | 130/22 H |

FOREIGN PATENT DOCUMENTS 1520965  3/1968  France ..................................... 56/14.6

Primary Examiner—Paul J. Hirsch

[57] ABSTRACT

The use of a baffle (61) spaces the horizontal cleaning air discharge a substantial distance below the accelerator rolls (32, 33) to substantially reduce passage of cleaning air to the threshing area (18). This in turn reduces the amount of dirty air discharged from the forward end of the combine in the area of the operator's cab (26).

1 Claim, 3 Drawing Figures

AIR BAFFLE FOR HARVESTER ACCELERATOR ROLLS

TECHNICAL FIELD OF THE INVENTION

This invention relates to combine harvesters and more particularly to a special air baffle below the accelerator precleaner which substantially reduces the flow of cleaning air to the threshing area of the combine.

BACKGROUND OF THE INVENTION

The axial flow combines disclosed in U.S. Pat. Nos. 4,007,744; 4,103,691; 4,108,150; and 4,154,250 include a grain accelerator precleaner having a pair of toothed accelerator rolls which grip and accelerate threshed material downwardly across a horizontally directed air stream. In some operating conditions, it has been found that an excessive portion of the stream of cleaning air passes into the threshing area of the combine by way of the accelerator precleaner resulting in excessive discharge of dirty air from the front of the combine in the area of the operator's cab. This decreases the operator's visibility and increases the load on the air conditioner filter. The primary object of the present invention is to minimize the flow of the cleaning air to the threshing area of the combine by way of the accelerator rolls without reducing the flow of cleaning air to the cleaning area of the combine.

BRIEF DESCRIPTION OF THE INVENTION

The invention may be advantageously used in a harvester having a precleaner disposed between its threshing and cleaning areas which includes a pair of toothed accelerator rolls whose length is coextensive with the width of the cleaning area and which grip and accelerate threshed material downwardly across a horizontal stream of cleaning air which separates most of the chaff from the grain. The discharge slot for the accelerator rolls and the cleaning air discharge duct are so constructed and arranged as to minimize passage of cleaning air to the threshing area by way of the accelerator rolls. The upper wall of the cleaning air duct has a terminal portion which is substantially horizontal and disposed below the accelerator rolls a sufficient distance to avoid directing the cleaning air through the discharge slot of the accelerator rolls. In the preferred embodiment of the invention the discharge slot for the accelerator rolls may have a width greater than the radius of either of the equal diameter accelerator rolls but not greater than three-fourths the diameter of an accelerator roll. Satisfactory results have been achieved by spacing the terminal portion of the upper wall of the cleaning air duct below the accelerator rolls a vertical distance at least as great as one-half the radius of one of the accelerator rolls.

BRIEF DESCRIPTION OF THE DRAWINGS

One embodiment of the invention is illustrated in the drawings wherein:

FIG. 1 is a side view of an axial flow combine with parts broken away for illustration purposes;

DETAILED DESCRIPTION OF THE INVENTION

Figure 1:
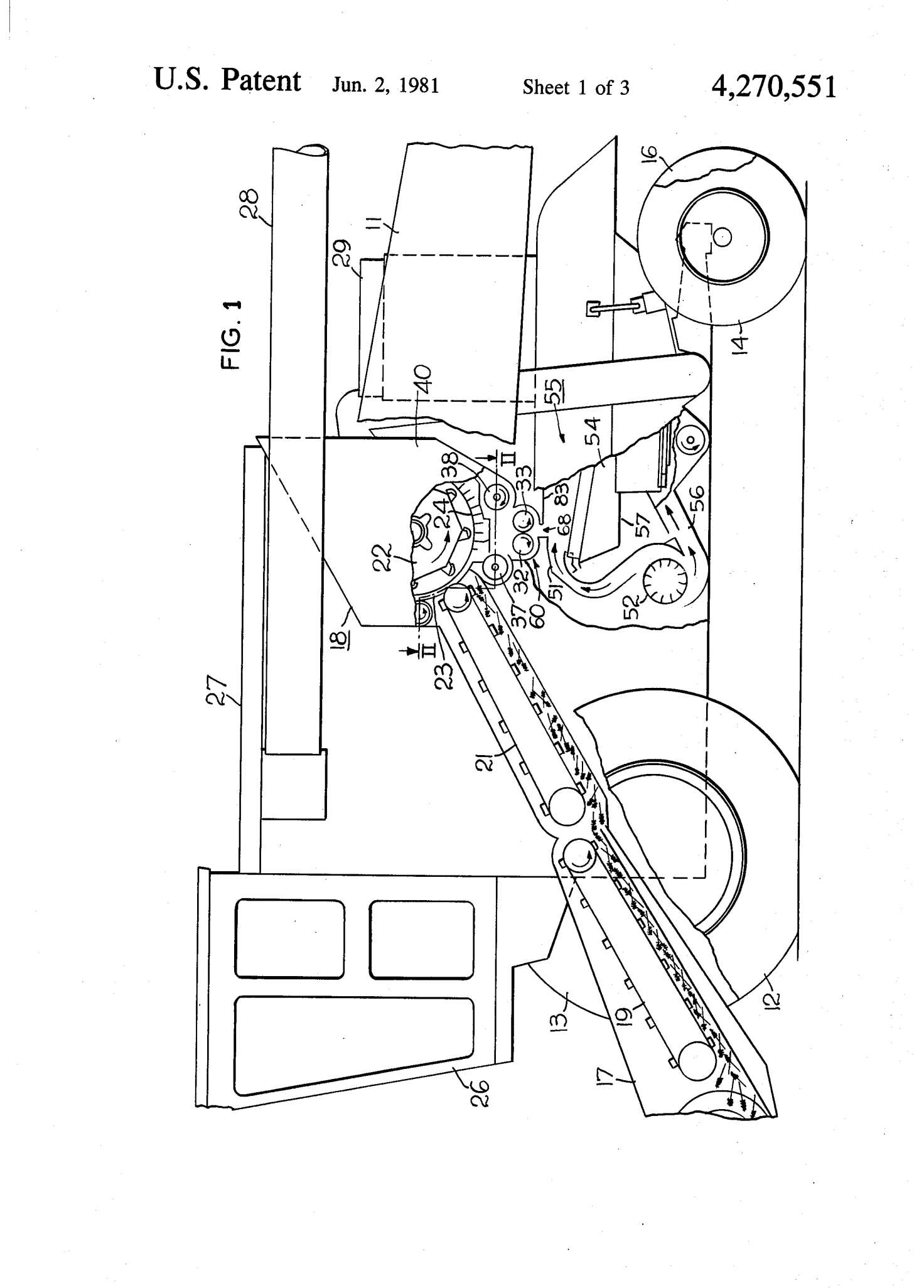
Figure 2:
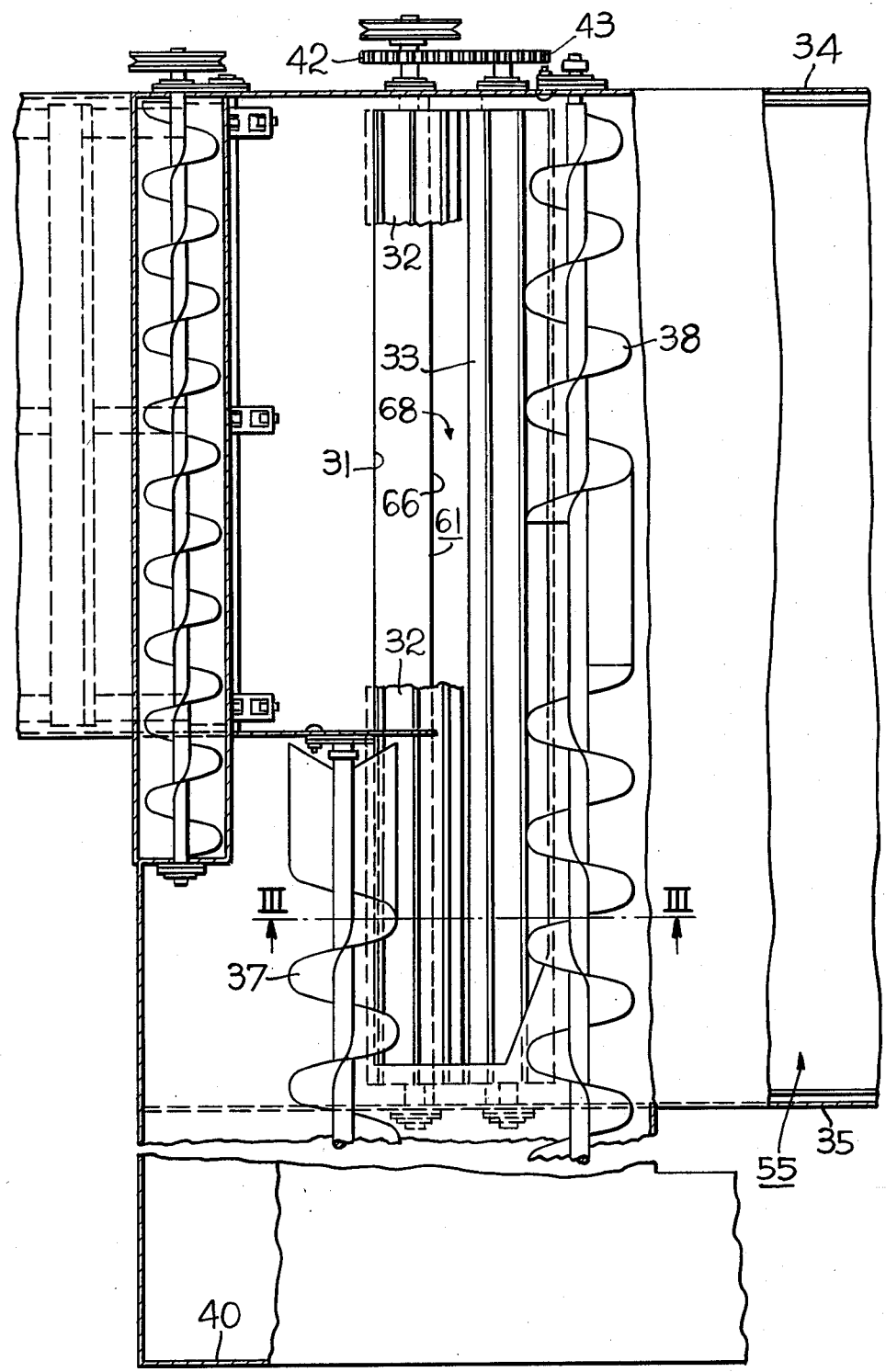
FIG. 2 is a section taken along line II—II in FIG. 1.

Referring to FIG. 1 an axial flow harvester or combine 11 includes a pair of front driving wheels 12, 13 and a pair of steerable rear wheels 14, 16. Portions of the harvested crop are conveyed from the header 17 to the threshing area 18 of the combine by way of slat type conveyors 19, 21. The threshing area 18 of the combine includes a rotating cylinder 22 and a stationary cylindrical cage 23 which includes a concave 24 in the bottom thereof. An operator's cab 26 is provided at the forward end of the combine 11 in front of a grain bin 27 which has an unloading tube 28. An engine 29 at the rear of the combine provides power for propelling the combine and for other power consuming mechanisms such as cutting, conveying, harvesting and cleaning apparatus.

Figure 3:
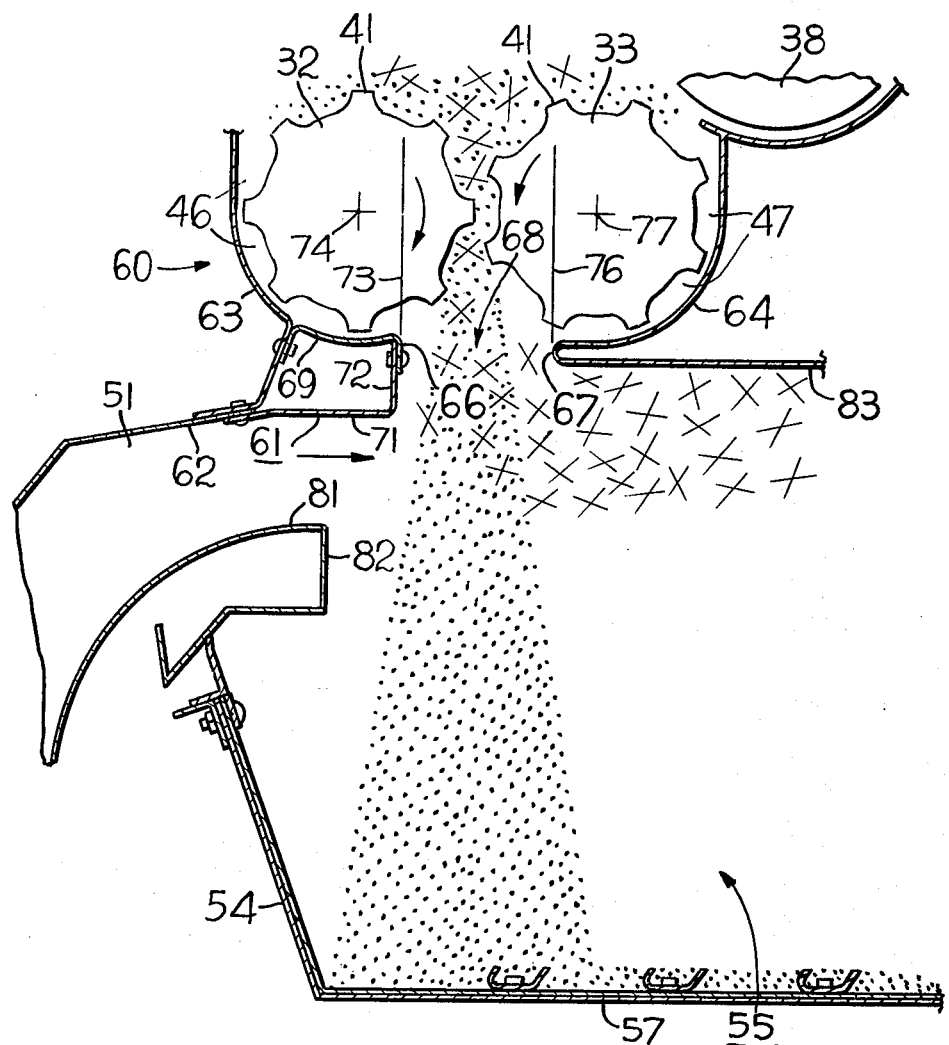
FIG. 3 is a section taken along line III—III in FIG. 2.

Referring also to FIG. 2, threshed material (a mixture of grain, chaff and stalk particles) passing through the perforated openings of the cage 23 and its concave 24 falls downwardly through transversely extending opening 31 aligned with and disposed above a pair of toothed, equal diameter accelerator rolls 32, 33. The opening 31 is substantially coextensive with the length of the side-by-side accelerator rolls 32, 33. The cleaning area 55 disposed between the vertical sidewalls 34, 35 is substantially coextensive with the accelerator rolls 32, 33 and is narrower from the transverse width of the threshing area 18 the lateral extremities of which are defined by sidewalls 34 and 40. A pair of distribution augers 37, 38 are provided to properly distribute threshed material to the accelerator rolls 32, 33 by way of the accelerator feed opening 31. The accelerator rolls 32, 33, as illustrated in FIGS. 2 and 3, are driven by gears 42, 43 to run in opposite directions at the same speed with the teeth 41 staggered in relation to each other. The axes 74, 77 of the accelerator rolls 32, 33 are spaced from each other a distance equal to the diameter of the rolls. The teeth 41 on the rolls are positioned somewhat like the teeth on a pair of meshing spur gears, although the teeth do not contact each other. The rolls 32, 33, acting in the manner of a gear pump, tend to convey air in the spaces 46, 47 intermediate the teeth 41 to the threshing area of the combine.

A mixture of grain, chaff and stalk particles is accelerated downwardly by the accelerator rolls 32, 33, as illustrated in FIG. 3, and the chaff and other light particles are blown rearwardly by a rearwardly directed horizontal stream or layer of pressurized air directed by an upper duct 51 which receives air from a transverse blower or fan 52, which is illustrated in FIG. 1. The fan 52 also supplies cleaning air for the shoe assembly 54 of the cleaning area 55 of the combine by way of a lower duct 56. The accelerated clean grain passes downwardly to the grain pan 57 of the shoe assembly 54 from whence it moves rearwardly to shoe sieves, not shown. In prior art combine constructions as illustrated in U.S. Pat. Nos. 4,103,691; 4,108,150; 4,154,250 and 4,007,744, the air discharged by the upper duct 51 was so directed that an excessive amount passed to the threshing area 18 of the combine by way of the accelerator rolls 32, 33. In order to minimize the flow of cleaning air from the duct 51 to the threshing area of the combine, an air baffle 61 was added to extend the upper wall 62 of the duct 51 rearwardly and also to space the upper duct terminus at a lower level so that air discharged from the duct 51 is directed away from the accelerator rolls 32, 33. Although in the illustrated embodiment of the invention a baffle 61 extending from wall 34 to wall 35 was added to existing components of the combine, it should be understood that other structural components may be used to carry out the invention.

The accelerator precleaner area 60 of the combine, disposed between the threshing area 18 and the cleaning area 55, includes a pair of cylindrically shaped walls 63, 64 between sidewalls 34, 35 in complementary confronting relation to the horizontally outer peripherial portions of the accelerator rolls 32, 33, respectively, which curve downwardly and thence horizontally toward one another terminating at transverse edges 66, 67 defining a downwardly open discharge slot 68 which extends from sidewalls 34 to sidewall 35 and thus is substantially coextensive with the width of the cleaning area 55 and the accelerator rolls 32, 33.

Part of wall 63 is provided by the upper wall portion 69 of the baffle 61 which is interconnected by a bottom wall part 71 of the baffle by a vertical wall 72. The edge 66 and wall 72 lie in a vertical transverse plane 73 which is spaced horizontally inwardly from the axis 74 of roll 32 a distance which is approximately equal to the distance by which a vertical transverse plane 76 through edge 67 is spaced horizontally inwardly from the axis 77. The planes 73, 76, which are parallel to one another and to the axes 74, 77, are spaced from each other a horizontal distance which is approximately one and one-third times the radius of either roll 32 or roll 33. When referring to the radius of the rolls 32, 33, we mean the distance from the axis to the radially outer extremity of a tooth 441.

The wall part 71 of the baffle 61 provides a substantially horizontal terminal portion to the upper wall 62 of the cleaning air duct 51 which is disposed below the rolls 32, 33 a vertical distance equal to approximately three-fifths of the radius of either accelerator roll. The lateral extremities of the duct 51 are defined by vertical sidewalls 34, 35 and the upper and lower extremities of the duct 51 are defined by upper wall 62, which includes wall part 71, and a bottom wall 81 which terminates at a transverse vertical wall 82. It will be noted that the upper wall 62 of the duct 51 terminates at the discharge slot 68 whereas the bottom wall 81 does not extend as far rearwardly.

The cleaning area 55 is defined in part by a horizontal upper wall 83 which terminates at its forward end at the transversely extending edge 67 of slot 68 and which is disposed vertically at a level above the terminal portion 71 of upper wall 62 of cleaning air duct 51. By providing a relatively narrow discharge slot 68 for the accelerator rolls 32, 33 of the precleaner 60 and by lowering the sheet of cleaning air discharged by duct 51, the amount of cleaning air passing to the threshing area 18 is greatly reduced. This reduces the volume of dirty air that is discharged from the front of the combine, through the feeding conveyor 19, 21, and improves operator visibility, comfort and efficiency.

The embodiments of the invention in which an exclusive property or privilege is claimed are defined as follows:

1. A harvester having a threshing area, a cleaning area of predetermined width disposed below the threshing area, an accelerator precleaner including a pair of equal diameter side-by-side accelerator rolls driven in opposite directions at the same speed, said rollers having axially extending teeth and being disposed beneath the threshing area and above and substantially coextensive with the width of the cleaning area, means for driving the rolls whereby threshed material is accelerated downwardly to the cleaning area and a source of pressurized air, characterized by a pair of cylindrical walls in said precleaner complimentary to the horizontally outer peripheries of said accelerator rolls and curving downwardly and thence horizontally toward one another terminating in edges defining a downwardly open discharge slot, said edges lying in parallel, vertical transverse planes spaced horizontally inwardly of the axes of said rolls, the width of said slot being greater than the radius of said rolls and less than three-fourths the diameter of said rolls, a cleaning air duct connected to said source of pressurized air having upper, lower and side walls defining an air discharge passage whose width is substantially coextensive to the length of said accelerator rolls and cleaning area, said discharge passage directing a horizontal layer of air across said downwardly accelerated threshed material, said upper wall of said duct having a terminal portion which is substantially horizontal and disposed below said rolls a vertical distance at least as great as one-half the radius of said rolls, a vertical wall lying in one of said vertical transverse planes and interconnecting one of said edges of said slot and said upper wall of said duct, said one vertical transverse plane being spaced horizontally from the axis of one of said rolls in the direction toward said other roll a distance at least one-third the radius of said rolls, and a generally horizontal upper wall defining in part said cleaning area and terminating at the other of said edges, said horizontal upper wall of said cleaning area being disposed at an elevation above said upper wall of said air duct, whereby air discharged by said duct is directed in a horizontal direction and below said upper wall of said cleaning section.

* * * * *